Sept. 9, 1952        H. E. HODGSON        2,609,895
BRAKE SHOE
Filed Feb. 16, 1945
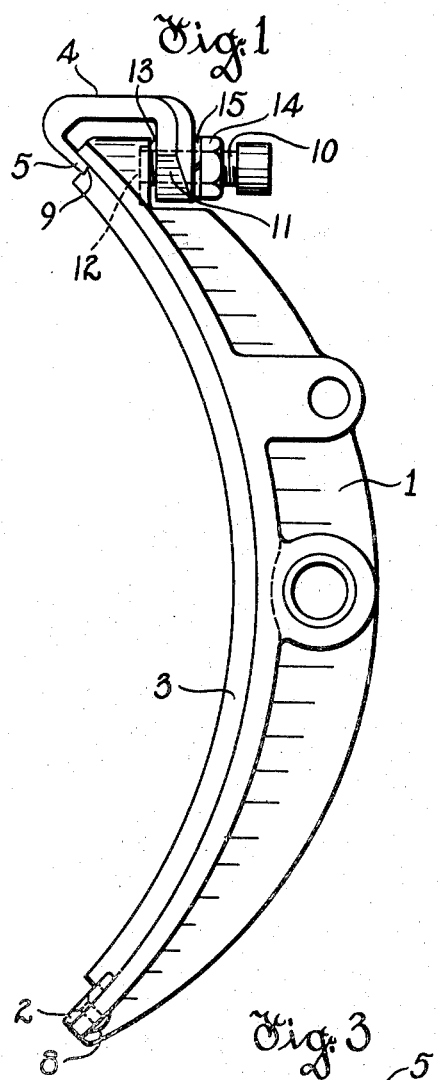
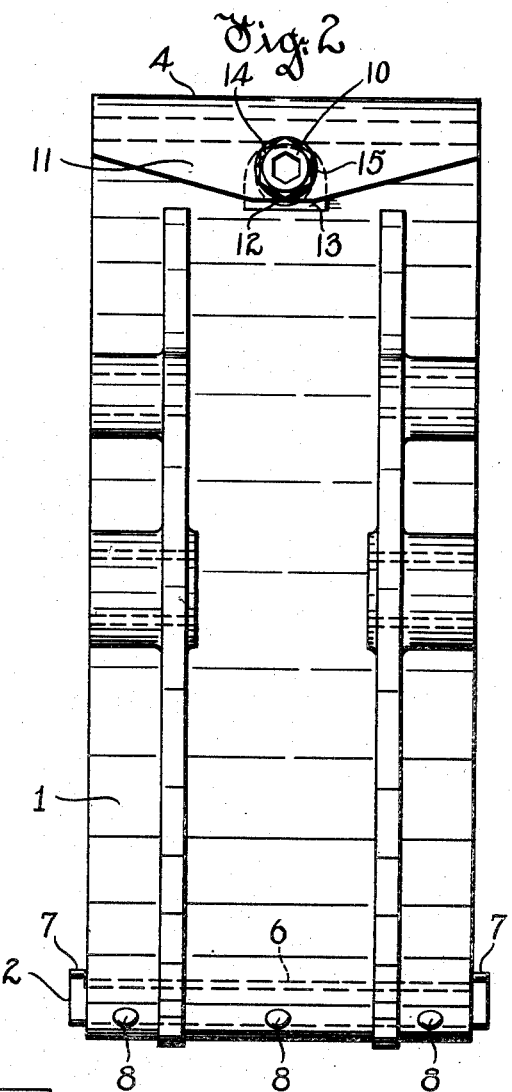
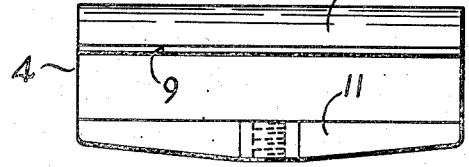
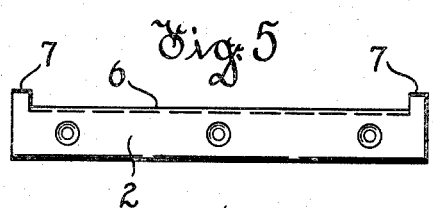
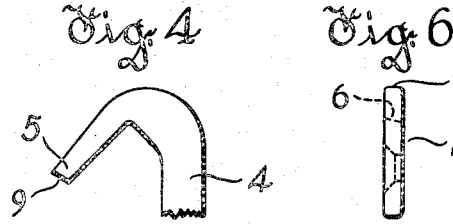
Inventor
Howard E. Hodgson
By   Attorney Patented Sept. 9, 1952

2,609,895

UNITED STATES PATENT OFFICE 2,609,895

BRAKE SHOE

Howard E. Hodgson, Wauwatosa, Wis., assignor to Cutler-Hammer, Inc., Milwaukee, Wis., a corporation of Delaware Application February 16, 1945, Serial No. 578,188

1 Claim. (Cl. 188—234)

This invention relates to rigid brake shoes requiring linings. Commonly the linings of brake shoes have been riveted to the shoes and this method of attachment has numerous disadvantages including impairment of the lining and need of removal of the shoe for renewal of the lining.

The present invention has among its objects to provide improved attaching means for brake linings such as are used extensively in brake service, which means will obviate the aforementioned and other disadvantages of the riveted linings.

According to the present invention it is proposed to hold the lining to its shoe by pressure applied to the ends of the lining, the pressure required being low relative to the torque. The pressure need only equal the difference between the frictional grips of the two surfaces of the lining engaging the shoe and the brake wheel. Thus in one type of 18″ brake having a torque rating of 900 pound feet the tangential force on each shoe is 600 pounds, and assuming the difference in friction to be as much as 2 to 1, the thrust force required at the end of the lining would be 300 pounds. This, when reduced to pounds per square inch of the pressure pieces, amounts to about 400 pounds per square inch, which is entirely practical with linings having the ordinary hardness and strength of those of either the molded type or the folded and compressed type.

One embodiment of the invention is illustrated in the accompanying drawing which will now be described, it being understood that the embodiment illustrated is susceptible of various modifications without departing from the scope of the appended claim.

In the accompanying drawing,

Figure 1 is a side elevation of a brake shoe with its lining attached;

Fig. 2 is a rear elevation of the brake shoe of Fig. 1;

Fig. 3 is an elevational view of one lining securing member;

Fig. 4 is a detail view of the member shown in Fig. 3;

Fig. 5 is an elevational view of a second lining securing member, and

Fig. 6 is an end view of the member shown in Fig. 5.

Referring to Figs. 1 and 2, the same show a rigid brake shoe 1 which in the main is of a conventional form. This shoe, however, is without the usual holes for lining rivets, and at one end carries a transversely extending fixed plate 2 against which is abutted one end of the brake lining 3. At its opposite end the shoe 1 carries a clamp 4, having a tip 5 bearing against the adjacent end of the lining 3, which lining may be of any preferred material suitable for securement by such end members.

Preferably the end member 2 has an undercut straight edge 6 (Figs. 5 and 6) of a length equal to the width of the lining 3 to bite into the end edge of the lining, and preferably member 2 has end projections 7 forming abutments for the side edges of the extremity of the lining. As shown the member 2 is fixed to shoe 1 by rivets 8 passing through both, the shoe being shown as drilled for three such rivets. In practice it may be found desirable to permit of play of member 2 to conform to the cut end of the lining if not cut square, and to this end the member 2 may be secured by a single centrally located rivet 8.

The clamp 4 is preferably formed at its tip 5 with a straight undercut edge 9 of a length equal to the width of lining 3 to bite into the end edge of the lining. The tip 5 of the clamp hooks over the end of the brake shoe and is adapted to be drawn into position by a clamping bolt 10 threading through a portion 11 of the clamp and bearing against a surface 12 provided on the brake shoe. As shown the brake shoe is notched to receive the portion 11 of the clamp and the bearing surface 12 is the bottom of a shallow recess in wall 13 of such notch.

With the lining 3 cut to the proper length, it may be easily and properly clamped in place on the shoe, and when this is accomplished the clamping bolt may be locked by a lock nut 14 carried by the bolt together with a lock washer 15 interposed between nut 14 and part 11 of the clamp. Such attachment of the lining will, unless there is breakage, enable use of the lining until it is worn very thin at its midpoint, probably until it is worn to $\tfrac{1}{16}$″.

When the lining requires renewal it is merely necessary to release the brake shoe for tilting to a position such that with the clamp 4 removed the worn lining can be conveniently removed, and a new one inserted. Then the clamp is replaced and tightened, after which it is only necessary to readjust the brake, so that renewal of the lining requires but a few minutes as compared with probably two hours or more work in renewing a riveted lining.

What I claim as new and desire to secure by Letters Patent is:

In combination, a brake shoe having a concave surface, a lining for said concave surface of the shoe, and securing means for the lining comprising members fixed to the shoe to engage the ends of the lining to take the end thrusts thereof, one of said members being of hooked form to hook over an end of the shoe and having a clamping bolt to clamp the same to the shoe, said hooked member bearing on said concave surface of the shoe and being adjustable lengthwise of said surface by adjustment of said clamping bolt and said hooked member at all other points having clearance from the shoe.

HOWARD E. HODGSON.

REFERENCES CITED

The following references are of record in the file of this patent:

UNITED STATES PATENTS

| Number | Name | Date |
|---|---|---|
| 86,007 | Dorr | Jan. 19, 1869 |
| 214,623 | Christopher | Apr. 22, 1879 |
| 1,027,390 | Peck | May 21, 1912 |
| 1,102,523 | Lindquist | July 7, 1914 |
| 1,686,190 | Thompson | Oct. 2, 1928 |
| 1,785,076 | Freshkoff | Dec. 16, 1930 |